Figure 1:
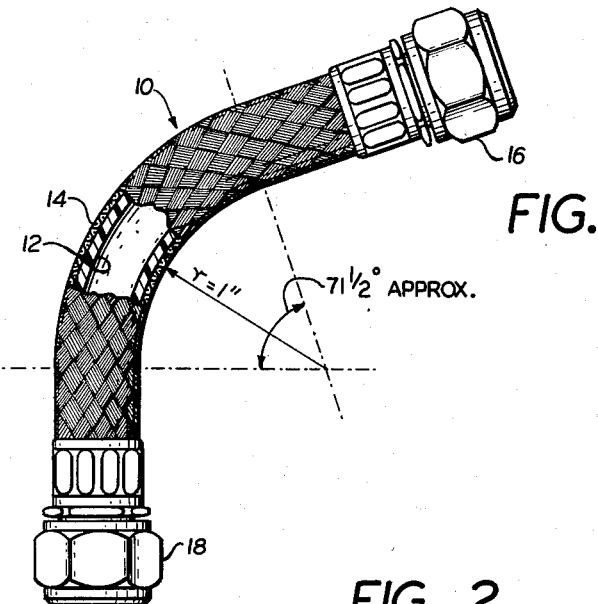

April 12, 1960  H. V. JENKINS  2,932,065
PRESSURE PREFORMING OF FLEXIBLE HOSE
Filed Feb. 20, 1959

INVENTOR
HERBERT V. JENKINS
BY
ATTORNEYS

2,932,065
PRESSURE PREFORMING OF FLEXIBLE HOSE

Herbert V. Jenkins, West Caldwell, N.J., assignor to Resistoflex Corporation, Roseland, N.J., a corporation of New York Application February 20, 1959, Serial No. 794,728

3 Claims. (Cl. 18—56)

This invention relates to flexible hose lines and more particlularly to hose lines having a polytetrafluoroethylene (hereinafter abbreviated P.T.F.E.) tube with a wire braid covering.

There are numerous applications in which flexible hose lines are used by preference in order to avoid vibration failure and difficult installation problems which are encountered in the use of rigid metal tubing. The types of installation under discussion are found in numerous kinds of apparatus but in particular in the "plumbing" of jet engines and other types of aircraft power plants. There is a great quantity of tubing, for example, on a jet engine for conveying fuel and oil, and the space requirements are such that in many places very tight bends of the tubing or hose must be made, that is, bends with a relatively short radius, including various complex bends.

The use of flexible hose lines on jet engines and for other applications wherein they are subjected to high temperature conditions heretofore requiring the use of metal tubing has recently become feasible, it should be noted, by the development of hose having a tube of P.T.F.E. which material is capable of use under operating temperatures up to about 500° F. P.T.F.E., however, is not as flexible as rubber and when covered with a layer of wire braid, usually steel, provides a fairly rigid hose line As a consequence, straight lengths of such hose are often difficult to install, particularly in tight places and where a large degree of bending is required.

In the copending application of Irving D. Press, Serial No. 553,335, filed December 15, 1955, and assigned to the same assignee as the present application, there is described and claimed a method of forming a bent section of P.T.F.E. tubing wherein a flexible mandrel or the like is inserted in a length of the tubing which is then bent while cold and subsequently heated, whereupon the mandrel is removed after cooling. The foregoing method works extremely well and may normally be preferred to the method to be described hereinafter. However, under certain circumstances, say from a standpoint of convenience or lack of facilities or other factor, it may not be possible or desirable to submit the hose line to the application of heat. Under these conditions resort may be had to the present invention.

Quite unexpectedly it has been discovered that a wire braid covered tube of P.T.F.E. can be "locked" in a bent condition by applying internal pressure while restrained in such condition. By "locked" is meant that, whereas the length of hose may have been initially straight, after processing in accordance with the invention, the hose will have a permanently bent section in the free or unrestrained condition.

Therefore, in accordance with the present invention there is provided a method of forming a bent section from a length of flexible hose having a P.T.F.E. tube with a wire braid covering, comprising the steps of filling the hose with a fluid under pressure sufficient to prevent collapse of the tube wall during bending but insufficient to interfere with bending, next bending the hose and securing it in approximately the shape desired for the bent section while maintaining said pressure, due allowance being made for relaxation of the bend when the hose is later released, subsequently increasing the pressure of the fluid and holding the increased pressure for a predetermined time interval while the hose remains secured, the combination of said increased pressure and said time interval being chosen such as to cause the desired shape to be retained when said hose is free of restraint and internal pressure, and thereafter freeing said hose after releasing the pressure and removing said fluid.

Figure 2:
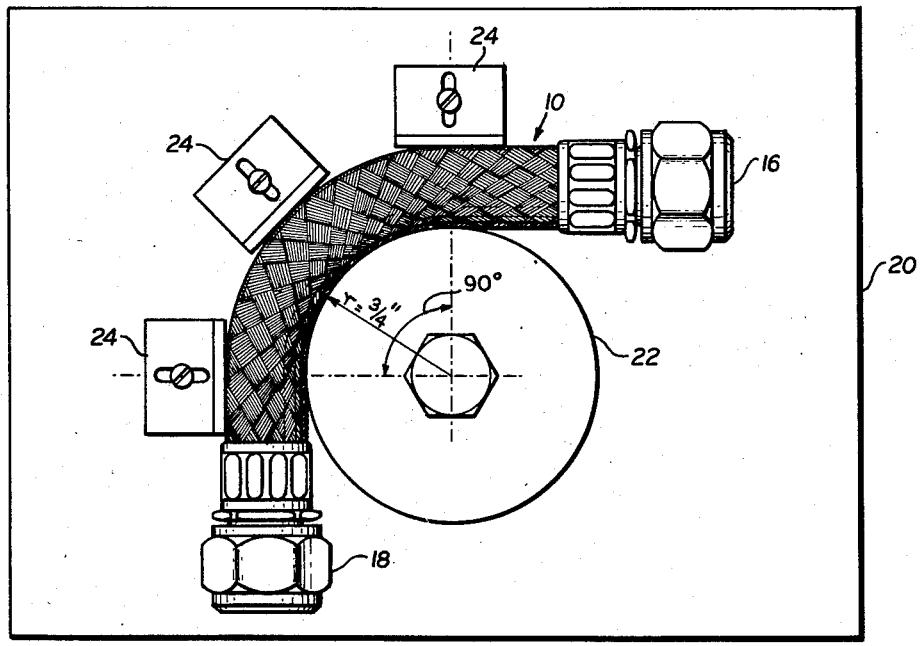

The invention will be better understood after reading the following detailed description with reference to the appended drawing in which:

Fig. 1 is a plan view partly in section of a length of flexible hose having a bent section formed by the method of the present invention; and Fig. 2 is a plan view of the same length of flexible hose as it would appear in the fixture for processing in accordance with the present invention.

Referring now to Fig. 1, there is illustrated a length of flexible hose 10 having a P.T.F.E. tube 12 with a wire braid covering 14. The hose 10 is provided with end fittings 16 and 18 of suitable construction in any well known manner. For purposes of illustration only, the fittings are represented as being of the crimped-on or swaged type with swivel nuts.

Depending upon the hose diameter, it can, in accordance with the present invention, be provided with a bent section of any radius greater than a given minimum for that size. In Fig. 1 it has been assumed that the hose line is of −6 size having an outside diameter of 7/16 inch and an inside diameter of 5/16 inch. For this size hose it has been found that the tightest bend which can be formed without causing excessive flattening or collapse of the tube wall has a radius of about 1 inch. As shown in Fig. 1 the bent section occupies an arc of approximately 71½°. The significance of this figure which has been chosen only as an example will be explained hereinafter. Let it be assumed, now, that it is desired to produce a bent section of hose as shown in Fig. 1.

Starting first with a suitable length of straight hose it is assembled to the end fittings. The hose assembly is then coupled by way of its fittings to a supply of oil whose flow and pressure can be regulated. In an appropriate manner the oil pressure within the hose is established at some low value, say between 5 and 10 p.s.i. The pressure should be sufficient to prevent collapse of the tube wall during bending but insufficient to interfere with bending.

With the pressure established, the hose is bent and secured in approximately the shape desired, due allowance being made for relaxation of the bend when the hose is later released. By due allowance is meant that the hose is overbent or bent to a smaller radius over a longer arc. In the case of the present example, the hose 10 is now bent about a radius of ¾ inch over an arc of 90°. Calculation reveals that a −6 hose line bent about a radius of ¾ inch and occupying an arc of 90°, will occupy only about 71½° when relaxed to a radius of 1 inch. It is believed that this will be borne out closely in practice.

As shown in Fig. 2, the bent section of hose 10 can be secured in a fixture consisting of a base plate 20, a radius block 22, and a plurality of adjustable clamping brackets 24.

After the hose line is secured in the fixture the oil pressure is increased and held for a predetermined time interval. The combination of increased pressure and time interval is chosen such as to cause the desired shape to be retained when the hose is free of restraint and internal pressure. A pressure of at least 1500 p.s.i. held for at least 5 minutes will be found satisfactory. For convenience it may be desirable to employ a higher pressure such as the proof pressure of the line whereby subsequent proof testing is eliminated. The oil can then be drained and the line removed from the fixture. It will be found to relax or open up to approximately the configuration of Fig. 1.

The amount of overbend required varies between hose sizes and will be determined by any number of factors such as wall thickness of the P.T.F.E. tube, the braid construction and so forth. As a result, it is impossible to provide any definite criterion or guide. To the extent it may be of some assistance, the following tabulation is furnished.

| Hose Size | | | Min. Bend Radius Obtainable | Bend Radius In Fixture |
|---|---|---|---|---|
| Dash No. | I.D. | O.D. | | |
| −4 | 3/16 | 5/16 | 1 | 5/8 |
| −5 | 1/4 | 3/8 | 1 | 3/4 |
| −6 | 5/16 | 7/16 | 1 | 3/4 |
| −8 | 13/32 | 9/16 | 1 1/2 | 1 1/4 |

In the foregoing tabulation all dimensions are in inches or fractions of an inch and all radii are to the inner surface and not to the centerline of the hose. It can be assumed that the minimum bend radius obtainable will increase as the hose diameter increases beyond the sizes listed.

It is believed that a word of explanation is in order. With low pressure oil in a line it has been found that any attempt to bend a given size hose to a smaller radius than that shown in the right hand column will result in excessive flattening of the hose cross-section and eventual collapse. This action follows both from the nature of the wire braid and the forces it exerts upon the tubing as well as from the limitations on the ability to deform the P.T.F.E. tubing. Furthermore, there is also a limitation on the length of the bend. At the minimum radii it has been found that the maximum arc that can be developed varies from between 90° and 110° for the sizes listed. Apparently the strain developed in the wire braid increases as more and more of the hose is bent about a given radius.

It is not altogether clear as to why the mere application of pressure should "fix" a bend in a length of hose of the type described. By way of conjecture, it has been suggested that the high pressure causes the P.T.F.E. to cold flow into the interstices of the wire braid covering so as to develop a mechanical bond therebetween. It will be understood that the individual strands of wire become somewhat displaced in the process of bending and will restrain the hose in a bent condition if they are not free to return to their original position.

It is believed that the invention has been described in sufficient detail to enable one skilled in the art to practice it. Let it be understood, however, that it may be subject to variation and modification without departing from the true spirit of the invention as defined in the appended claims.

What is claimed is:

1. A method of forming a bent section from a length of flexible hose having a polytetrafluoroethylene tube with a wire braid covering, comprising the steps of filling the hose with a fluid under pressure sufficient to prevent collapse of the tube wall during bending but insufficient to interfere with bending, next bending the hose and securing it in approximately the shape desired for the bent section while maintaining said pressure, due allowance being made for relaxation of the bend when the hose is later released, subsequently increasing the pressure of the fluid and holding the increased pressure for a predetermined time interval while the hose remains secured, the combination of said increased pressure and said time interval being chosen such as to cause the desired shape to be retained when said hose is free of restraint and internal pressure, and thereafter freeing said hose after releasing the pressure and removing said fluid.

2. A method of forming a bent section from a length of flexible hose having a polytetrafluoroethylene tube with a wire braid covering, comprising the steps of filling the hose with a fluid under pressure sufficient to prevent collapse of the tube wall during bending but insufficient to interfere with bending, next bending the hose and securing it in approximately the shape desired for the bent section while maintaining said pressure, due allowance being made for relaxation of the bend when the hose is later released, subsequently increasing the pressure of the fluid to at least 1500 p.s.i. and holding the increased pressure for at least 5 minutes while the hose remains secured, and thereafter freeing said hose after releasing the pressure and removing said fluid.

3. A method of forming a bent section from a length of flexible hose having a polytetrafluoroethylene tube with a wire braid covering, comprising the steps of filling the hose with oil under a pressure of the order of 5 to 10 p.s.i., next bending the hose and securing it in a suitable fixture in approximately the shape desired for the bent section while maintaining said pressure, due allowance being made for relaxation of the bend when the hose is later released, subsequently increasing the pressure of the oil to at least 1500 p.s.i. and holding the increased pressure for at least 5 minutes while the hose remains in said fixture, and thereafter freeing said hose from the fixture after releasing the pressure and draining said oil.

References Cited in the file of this patent

UNITED STATES PATENTS

| 203,842 | Leland | May 21, 1878 |
| 1,877,629 | Replogle | Sept. 13, 1932 |
| 2,247,558 | Nichols | July 1, 1941 |
| 2,391,252 | Louthan | Dec. 18, 1945 |
| 2,777,500 | Ekholm et al. | Jan. 15, 1957 |